7537X
Dingley & Savage,
Water Wheel,
Patented Apr. 16, 1833.
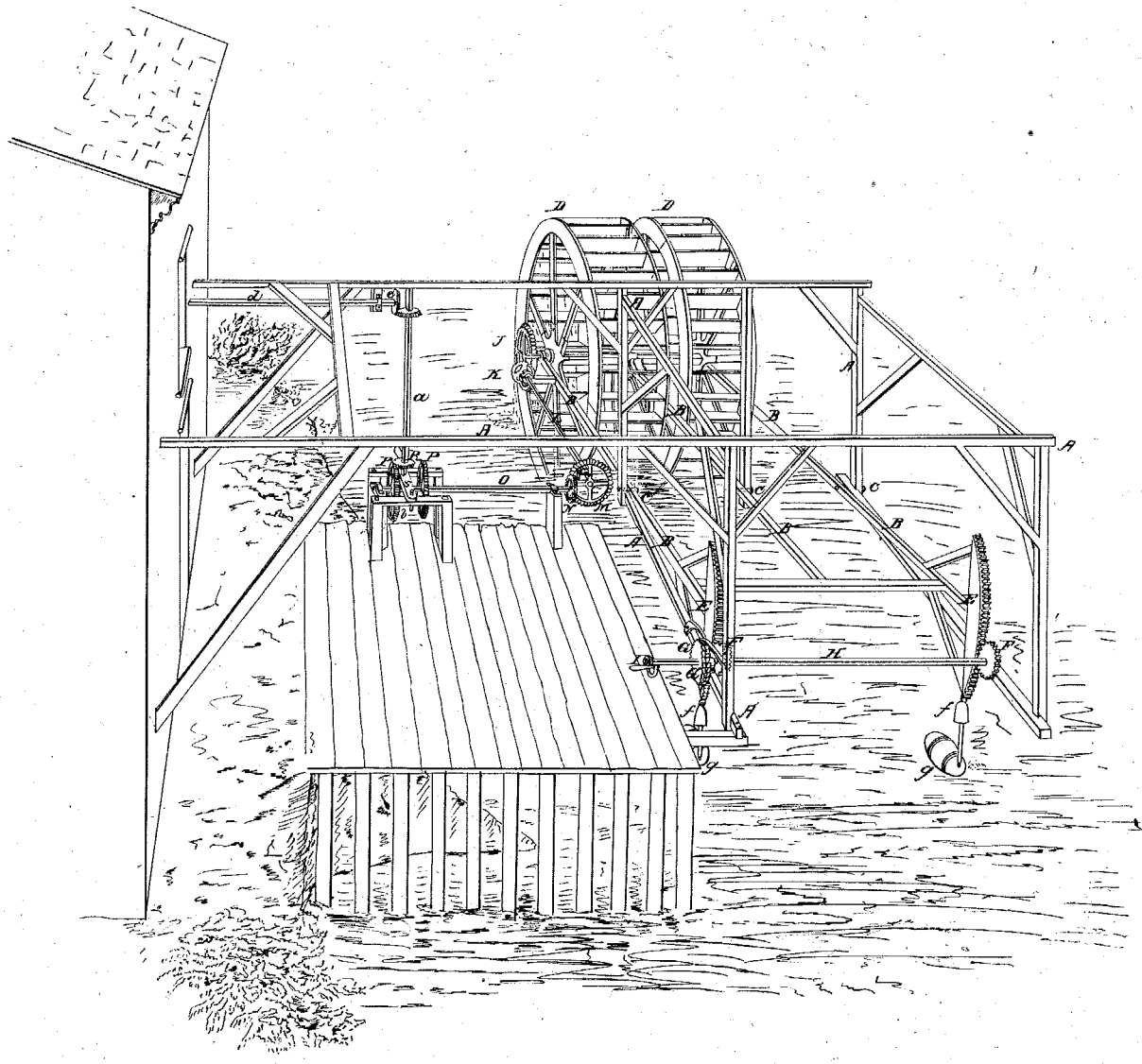
N. PETERS, PHOTO-LITHOGRAPHER, WASHINGTON, D. C.

7537X Oct. 16. 1833

Amasa Dingley & Israel Savage of Maine

Letters Patent

The Schedule referred to in these Letters Patent and making part of the same
containing a description in the words of the said Amasa Dingley and
Israel Savage themselves of their improvement in tide and current wa-
ter wheels for driving mills and other machinery To all whom it may concern, Be it known that We Amasa Dingley
of Winslow in the County of Kennebec and State of Maine and Isra-
el S Savage of Waterville County of Kennebec and State of Maine, have
made an improvement in tide and current water wheels, for driving mills
and other machinery, which is described as follows. This improvement
consists in raising or depressing the water wheels to suit the rise or fall
of the water, and in combining and concentrating the power of several
water wheels by means of connecting shafts. and gearing so as to unite
the whole force in one or more places for grinding or other purposes.
To effect these objects. the following machinery and arrangement is employed.
The machinery consists in the frame for supporting the water wheels swing-
-ing on an axle or centre with the segment cog wheels working into pin-
ion wheels for raising or depressing the water wheels, the connecting shafts
and gearing with the mode of reversing the motion. The frame to support
the water wheels &c is erected on or connected with a wharf, and is made
of a size and strength adapted to receive the several parts of the machinery
to be hereafter described. The water wheels are each suspended in a
frame adapted to the size of the wheels. The wheel is placed at one end and
a segment wheel at the other, turning on an axle in the centre supported in
the frame first mentioned. To balance the wheel weights are added on
the end with the segment wheels. The several frames containing the wa-
ter wheels are connected together, by scale beam levers turning on centre
pins to give the frames a simultaneous and regular movement when used
in tide water. A Buoy is attached to the end with the segment wheel
to regulate the dip of the wheel in the water. These segment wheels (one on
each side) work into pinion wheels fixed on an axle and having ratchet

7537X wheels fixed on an axle, and having ratchet wheels for securing the water wheels
in any position. A crank handle is put on the axle of the pinion wheels for
turning them and the segment wheels, when required to adjust the position
of the water wheels. A cog wheel is placed on the shaft of the water
wheel which works into a pinion fixed on a shaft turning on gudgeons
supported in the frame of the water wheel. At the other end of this shaft
is another bevel cog wheel meshing into a small pinion on the driving
shaft. This shaft is placed horizontally and in the same line with the
shaft upon which the water wheel is suspended; upon the driving shaft
are two bevel cog wheels facing inward. A perpendicular shaft having a small
pinion on the lower end is made to work into either of the before mentioned
bevel cog wheels, by a shifting lever placed in the centre supported and
turning on a pin and by which the motion of the wheel is reversed. Another
pinion is placed on each end of a long shaft, placed horizontally for con-
veying the power to any distance. There may be any number of these shafts
and pinions according to the number of water wheels &c
Operation. A frame to receive the water wheels is erected on the current of
a river or where the tide ebbs and flows, the Mill House being on shore.
By turning the crank handle placed on the axle of the pinion wheels, which
work into the segment wheels, the water wheels are brought to act in the
current at any required depth; and in case of tide water the Buoys have
the same effect. The bevel wheels on the axle of the water wheels turn the
cog wheels on the small shaft, that work into and turn the cog wheel
and shaft with the bevel wheels upon it which also turn the cog wheel
on the shaft for conveying the motion as well as the vertical shaft with
its cog wheel. The invention here claimed is the before described
Combination and arrangement of machinery by which the water wheels
are made to work in the water at any required depth also in conveying
the motion to any required distance. For a further illustration of our
invention, we refer to the model and drawing of the same deposited
in the Patent office. In testimony whereof we hereunto sub-
scribe our names, this 9th day of [illegible] 1833

[illegible] [illegible]

Witnesses } Wm P Elliot
} Robt Clarke.

([illegible] Words)

Amasa Dingley
Israel S Savage

Drawing made